United States Patent
Sologuren-Sanchez et al.

(10) Patent No.: US 7,391,605 B2
(45) Date of Patent: Jun. 24, 2008

(54) ENCAPSULATED GAS-INSULATED SWITCHGEAR ASSEMBLY

(75) Inventors: Diego Sologuren-Sanchez, Wettingen (CH); Walter Holaus, Zürich (CH); Lorenz Müller, Gebenstorf (CH); Michael Bruckert, Rümlang (CH)

(73) Assignee: ABB Technology AG, Zurich (CH)

( * ) Notice: Subject to any disclaimer, the term of this patent is extended or adjusted under 35 U.S.C. 154(b) by 42 days.

(21) Appl. No.: 11/508,944

(22) Filed: Aug. 24, 2006

(65) Prior Publication Data

US 2006/0283841 A1 Dec. 21, 2006

Related U.S. Application Data

(63) Continuation of application No. PCT/CH2005/000114, filed on Feb. 28, 2005.

(30) Foreign Application Priority Data

Feb. 27, 2004 (EP) ................................. 04405114

(51) Int. Cl.
*H02B 13/02* (2006.01)
*H01H 33/70* (2006.01)
(52) U.S. Cl. ..................... 361/612; 361/604; 361/605; 218/43
(58) Field of Classification Search .............. None
See application file for complete search history.

(56) References Cited

U.S. PATENT DOCUMENTS

| | | | | |
|---|---|---|---|---|
| 4,745,522 A | * | 5/1988 | Mitomo et al. | ............. 361/612 |
| 4,890,193 A | * | 12/1989 | Tsubaki | ............. 361/612 |
| 5,578,805 A | * | 11/1996 | Berger et al. | ............. 218/43 |
| 5,627,723 A | * | 5/1997 | Hageli et al. | ............. 361/602 |
| 5,991,148 A | * | 11/1999 | Heil et al. | ............. 361/605 |

(Continued)

FOREIGN PATENT DOCUMENTS

EP 1 068 624 B1 1/2001

(Continued)

OTHER PUBLICATIONS

International Preliminary Report on Patentability and Attached English Translation of the the Written Opinion, issued in PCT/CH2005/000114 on Oct. 12, 2006, The International Bureau of WIPO, Geneva, CH.

(Continued)

*Primary Examiner*—Boris L Chervinsky
(74) *Attorney, Agent, or Firm*—Buchanan Ingersoll & Rooney PC

(57) ABSTRACT

The switchgear assembly has a polyphase design and has a gas-filled, modular encapsulation for each phase. Provided as the modules are at least one busbar, which is guided predominantly horizontally, a circuit breaker and two combined disconnecting-earthing switches having a disconnection and grounding function. A first one of the combined disconnecting-earthing switches supports a section of the busbar and is connected between the busbar and a first current terminal of the circuit breaker. The second combined disconnecting-earthing switch is connected between an outgoing feeder or a further busbar of the assembly and the second current terminal of the circuit breaker. The combined disconnecting-earthing switches are aligned such that two drive apparatuses, which are provided for their actuation, point in the same, predominantly horizontal direction.

26 Claims, 5 Drawing Sheets

U.S. PATENT DOCUMENTS

| | | | |
|---|---|---|---|
| 6,134,101 A * | 10/2000 | Bucher et al. | 361/612 |
| 6,437,276 B1 | 8/2002 | Bruchmann et al. | |
| 6,573,469 B1 | 6/2003 | Piazza | |
| 6,683,267 B1 | 1/2004 | Piazza et al. | |
| 6,727,454 B2 * | 4/2004 | Okabe et al. | 218/43 |
| 7,236,351 B2 * | 6/2007 | Chavot et al. | 361/604 |

FOREIGN PATENT DOCUMENTS

| | | | |
|---|---|---|---|
| EP | 1 249 910 A2 | 10/2002 | |
| JP | 2003299216 A * | 10/2003 | |
| WO | 99/52119 | 10/1999 | |
| WO | 00/45486 | 8/2000 | |

OTHER PUBLICATIONS

Okabe et al., "Serialization of Standard Gas Insulated Switchgear", Hitachi Review, vol. 51, No. 5, 2002, pp. 169-173.
PCT Search Report dated Sep. 5, 2005.
European Search Report dated Sep. 24, 2004.

* cited by examiner

ENCAPSULATED GAS-INSULATED SWITCHGEAR ASSEMBLY

CROSS REFERENCE TO RELATED APPLICATION

This application claims priority under 35 U.S.C. §119 to European Application 04405114.2 filed in EPO on 27 Feb. 2004, and as a continuation application under 35 U.S.C. §120 to PCT/CH2005/000114 filed as an International Application on 28 Feb. 2005 designating the U.S., the entire contents of which are hereby incorporated by reference in their entireties.

TECHNICAL FIELD

The invention is based on an encapsulated gas-insulated switchgear assembly in accordance with the precharacterizing clause of patent claim 1. This encapsulation is filled with an insulating gas, for example nitrogen, air, sulfur hexafloride ($SF_6$) alone or in a mixture, with a pressure of up to a few bar. The assembly is typically operated at voltages of a few hundred kV and contains as the components at least one busbar which is guided predominantly horizontally, a circuit breaker having two current terminals, of which a first current terminal can be connected to the busbar, and two disconnecting switches (combined disconnecting-earthing switches) having a disconnection and grounding function.

The combined disconnecting-earthing switches are preferably of identical design. A first one of the combined disconnecting-earthing switches supports a section of the busbar and is connected between the busbar and the first current terminal. The second combined disconnecting-earthing switch is connected between an outgoing feeder of the assembly or a horizontally guided second busbar of the assembly and the second current terminal of the circuit breaker. The combined disconnecting-earthing switches make use of the fact that, in switchgear assemblies, the functions of disconnection and grounding are often required at the same location. Correspondingly, the combined disconnecting-earthing switches each have an encapsulating housing which is filled with insulating gas and to which a grounding contact is fixed in the interior. In addition, a disconnector contact, which is fixed to a current conductor, and a moveable contact element, which can be displaced along an axis and can be brought into or out of engagement either with the disconnector contact or with the grounding device contact, are arranged in the housing interior. Force is applied to the moveable contact element by a drive guided through the housing. By using a single drive it is therefore possible to realize the functions of disconnection and grounding.

PRIOR ART

In the precharacterizing clause, the invention makes reference to a prior art of switchgear assemblies, as is described in EP 1 249 910 A2. In a switchgear assembly described in FIG. 3 of this document and having a horizontally guided double busbar, a first current terminal of a circuit breaker can optionally be connected to a first or a second busbar of the double busbar via a first or a second busbar disconnector, which each have a disconnection and grounding function. A coupling panel or feeder described in FIG. 4 likewise has a horizontally guided double busbar. Each of the two current terminals of the circuit breaker is in each case passed to one of the two busbars of the double busbar via a busbar disconnector having disconnection and grounding functions and having only one drive. The busbar disconnector has an apparatus for grounding one of the two current terminals of the circuit breaker. In addition, it contains an apparatus for disconnecting one of the two busbars from the current terminal which can be grounded. In the case of all of these assemblies, separate drives for the grounding function and for the busbar disconnection and connection function are replaced by a single drive. Owing to the arrangement of the busbars, however, busbar disconnectors having different designs are required for each phase.

Such switching devices are known, for example, from Hitachi Review Vol. 51 (2002) No. 5 pp. 169 to 173 or from EP 1 068 624 B1. The switching devices described in these prior publications for gas-insulated, metal-encapsulated switchgear assemblies each have a three-position switch, which can implement all of the functions of a disconnecting and grounding switch using a single drive. In this case, a moveable contact element, which is arranged in an encapsulating housing, is displaced along an axis, which axis is passed through a disconnector contact and through a grounding contact. With a linear movement of the contact element, it is therefore possible for three switching positions of the switching device to be reached. In a first one of these three positions, the contact element is in engagement neither with the disconnector contact nor with the grounding device contact (neutral position), i.e. both an elbow disconnector integrated in the switching device and a grounding device integrated in the switching device are open. In a second position, the contact element engages in the disconnector contact. The disconnection switching point of the disconnector is now closed when the grounding device is open. In the third position, the contact element engages in the grounding contact. The grounding device is now closed when the disconnector is open.

Driving force for the moveable contact element is transmitted transversely with respect to its movement direction. For this purpose, the encapsulating housing requires additional space transversely with respect to the axis (Hitachi Review), or a specially designed current conductor accommodating a lever transmission is required (EP 1 068 624 B1).

DESCRIPTION OF THE INVENTION

The invention, as it is defined in the independent patent claim, achieves the object of specifying a switchgear assembly of the type mentioned initially which is characterized by a compact design and at the same time by considerable operational convenience.

In the switchgear assembly according to the invention, the combined disconnecting-earthing switches are aligned such that at least two drive apparatuses, which are provided for their actuation, point in the same direction. Sections of the assembly which are connected to the combined disconnecting-earthing switches are arranged in the opposite direction. For these reasons, the housing of the circuit breaker can be shortened, and the assembly may have a compact and clear design. If the drives are aligned towards a control aisle of the assembly, the positions of the drives and therefore also the switching positions of the combined disconnecting-earthing switches are visually accessible to the operator of the assembly. Good operational reliability and a high degree of operational convenience of the assembly are therefore achieved. These advantageous effects occur even if the assembly is equipped only with a single busbar.

The switchgear assembly can be single-phase-encapsulated or three-phase- or generally polyphase-encapsulated. A common drive apparatus is advantageously provided in each case for three phases. In each case a dedicated drive apparatus may also be provided for each phase. A drive apparatus comprises at least one drive unit, which transmits force to at least one switching device. In particular, the drive apparatus may comprise a lever system or force transmission elements, which transmit the force from a central drive unit to the number of switching devices which corresponds to the number of phases.

All of the drive apparatuses preferably point in the same direction. The drive apparatuses particularly preferably point in the same, predominantly horizontal direction. The circuit breaker is typically aligned horizontally. The combined disconnecting-earthing switches are advantageously of identical design. The identical design relates in particular to the shape of the housing or disconnector housing with the associated connection openings or connection flanges, but does not necessarily include an identical configuration of the combined disconnecting-earthing switches in the interior as regards their current-carrying elements and current interruption elements.

If the switchgear assembly contains a cross-coupling panel or feeder, i.e. if it also has a second busbar which is guided predominantly horizontally and a housing of the second combined disconnecting-earthing switch supports a housing of this second busbar, it is advantageous to arrange the disconnector housings and the busbars supported by the disconnector housings such that they are offset with respect to one another in the vertical direction. Whilst maintaining a compact design of the switchgear assembly, it is therefore also ensured in the cross-coupling feeder that the drives and therefore the switching positions of the combined disconnecting-earthing switches can easily be seen.

If the switchgear assembly according to the invention contains a double busbar, i.e. a third busbar is likewise provided which is guided predominantly horizontally but can be connected to the first current terminal via a third combined disconnecting-earthing switch, a housing of the first combined disconnecting-earthing switch supports a section of the first busbar, and a housing of the third combined disconnecting-earthing switch supports a section of the third busbar. The first and third combined disconnecting-earthing switches are preferably of identical design. If the two disconnector housings are connected to one another via a module which contains a connection node of the first current terminal, the housings of the first and the third combined disconnecting-earthing switches and the busbars supported by these housings should expediently be arranged such that they are offset with respect to one another in the vertical direction. Since the drives do not protrude from the busbars on both sides, the busbars can be joined together irrespective of the dimensions of the housing of the circuit breaker, as a result of which the assembly is extremely compact. Despite this high degree of compactness, it is still ensured that the drives and therefore also the switch positions can easily be seen.

The combined disconnecting-earthing switches are each in the form of elbow disconnectors. At least the first of the two limbs of the elbow is arranged predominantly horizontally and has, in a coaxial arrangement, a grounding contact, a drive guided through the grounding contact and two contacts of a disconnector. The above-described advantages can therefore be achieved in a particularly economical manner. That is to say only a single switch is then required for the functions of disconnection and grounding. Different switches, such as in particular series disconnectors, are then not required.

If, in the case of the second and the third combined disconnecting-earthing switches, the second limb of the elbow is guided in each case predominantly vertically and, in the case of the first combined disconnecting-earthing switch, predominantly horizontally, the third busbar provided in the assembly with a double busbar can be connected to the third combined disconnecting-earthing switch in a particularly space-saving manner. Then, the first busbar is attached to the second limb of the first combined disconnecting-earthing switch and extends in the direction of this limb, and the third busbar is attached to the first limb of the third combined disconnecting-earthing switch and is aligned perpendicularly with respect to the first limb.

A moveable one of the two disconnector contacts advantageously contains two contact parts, which are connected to a retaining element and of which a first contact part forms the mating contact of a grounding device containing the grounding contact and a second contact part forms the mating contact of a stationary contact of the disconnector. These measures make it possible to form three switching devices having the functions of disconnection and grounding, only disconnection or only grounding using only a single basic switching device. If the contact parts are connected detachably to the retaining element, retrofitting between the three switching devices takes place by means of opening or closing at most two detachable connections. If the retaining element supports both contact parts, the switching device is in the form of a combined disconnecting and grounding switch (combination disconnector). In this case, it is possible for the functions of disconnection and grounding to be carried out in a gas-insulated, encapsulated switchgear assembly using one switching device, which has only a single drive. However, this means that the disconnection point and grounding point in the assembly are closely adjacent to one another. If the disconnection point and grounding point are far removed from one another and it is only necessary to perform a grounding task or a disconnection task, only one of the contact tubes needs to be removed once one of the two detachable connections has been opened in order to provide a switching device with a disconnector or grounding device function. The electrical functions of disconnection and grounding, only disconnection or only grounding using a single type of switching device can therefore be covered in gas-insulated, encapsulated switchgear assemblies. The costs associated with the storage and fitting of the assembly are therefore reduced.

The node module, which is provided in the assembly according to the invention with a double busbar and contains the connection node, is advantageously in the form of a T and is installed in the assembly such that the arms of the T are aligned vertically and form a predominantly vertical longitudinal connection, such that the base of the T forms a predominantly horizontal transverse connection, and such that the module of the first combined disconnecting-earthing switch is connected to the node module at the horizontally guided base of the T, and the module of the third combined disconnecting-earthing switch is connected to the node module at the upwardly guided arm of the T. This node module makes it possible to install the first and the third combined disconnecting-earthing switches and improves the visibility of the switch positions and the revisability of the assembly in a simple manner by means of misaligning or offsetting the height of the first and the third combined disconnecting-earthing switches and the two busbars. At the same time, the gas chambers of the first and the third combined disconnecting-earthing switches can be shielded from one another by this encapsulating module, with the result that the revisability of the assembly is additionally improved. The housing of the node module may be in the form of a T or in the form of an X, but, irrespective of this, the connection node formed by current conductors is in the form of a T.

If the assembly according to the invention has two or more encapsulated phases, which in particular are single-phase- or polyphase-encapsulated, it is recommended for the combined disconnecting-earthing switches and further switching devices which may be provided and which only act as disconnectors or only as grounding devices to be of identical design and/or to be aligned in identical fashion in all phases. The production costs and maintenance costs of the assembly according to the invention can then be significantly reduced. This can be achieved, whilst at the same time saving on space, in a particularly advantageous manner by switching devices which are arranged in different phases but perform identical functions being arranged on a diagonal determined by the vertical and horizontal direction or spacing. Correspondingly, lever systems can be arranged on this diagonal which transmit force from a central drive unit to the number of switching devices which number corresponds to the number of phases.

Further embodiments, advantages and applications of the invention result from the dependent claims, the combinations of claims and from the description now following and the figures.

DESCRIPTION OF THE DRAWINGS

The invention will be explained below with reference to exemplary embodiments. In the drawings.

In all of the figures, the same references also denote functionally identical parts.

APPROACHES TO IMPLEMENTING THE INVENTION

Figure 1:
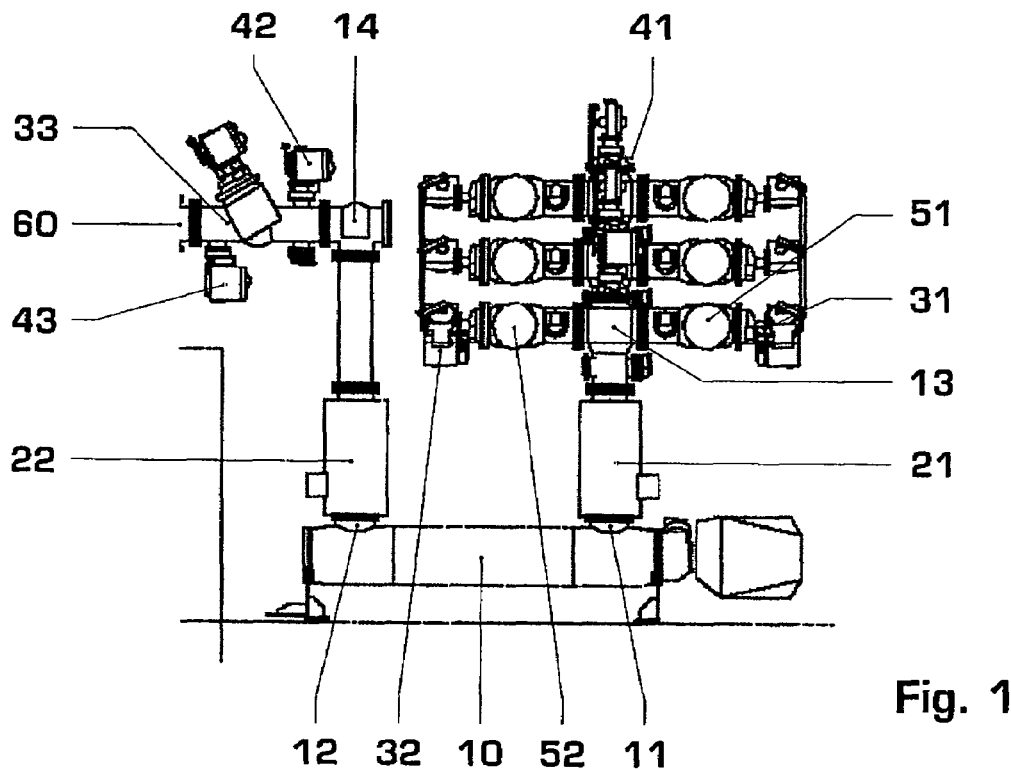
FIG. 1 shows a side view of a three-phase, single-phase-encapsulated switchgear assembly according to the prior art with a double busbar.
Figure 2:
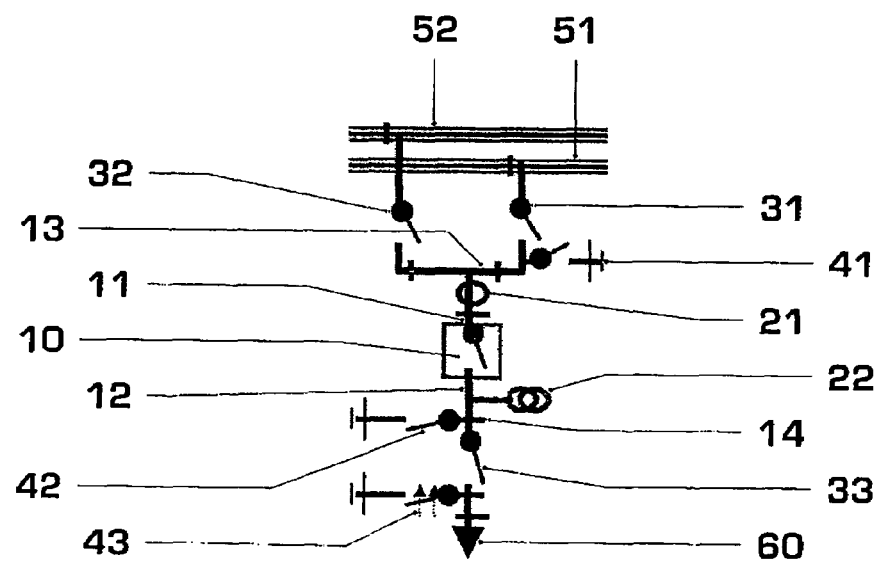
FIG. 2 shows a circuit diagram representing only one phase of the assembly shown in FIG. 1.

The switchgear assembly having a three-phase design illustrated in FIG. 1 and in accordance with the prior art is single-phase-encapsulated and has a separate metal encapsulation filled with insulating gas for each of its three phases. Each encapsulation is of modular design and has the circuit diagram shown in FIG. 2, in which a circuit breaker having two current terminals 11, 12 is denoted by the reference 10. As can be seen, the current terminal 11 is connected to a connection node 13 monitored by a current transformer 21, and the current terminal 12 is connected to a connection node 14 monitored by a voltage transformer 22. In addition, two busbar disconnectors 31, 32 and a grounding device 41 are connected to the connection node 13, and a disconnector 33 and a grounding device 42 are connected to the connection node 14. Those terminals of the busbar disconnectors 31, 32 which are remote from the connection node 13 are in each case connected to one of two horizontally guided busbars 51, 52, whereas that terminal of the disconnector 33 which is remote from the connection node 14 is connected to a grounding device 43 and an outgoing feeder 60 or a further busbar.

It can be seen from the topology of the assembly given in FIG. 1 that the circuit breaker 10 is in the form of a horizontally arranged encapsulating module and has a switch housing having two flange attachments representing the current terminals 11 and 12. A vertically guided encapsulating module containing the current transformer 21 is fixed to the flange attachment associated with the current terminal 11. This current transformer module 21 supports a T-shaped module accommodating the connection node 13. In each case one module containing the disconnector 31 or 32, respectively, is attached to each of the two arms of the T of this node module 13. The two disconnector modules 31 and 32 and the busbars 51 and 52 connected to the disconnectors are therefore arranged at the same height. The grounding device 41 is arranged at the upper end of the node module 13. A vertically guided module containing the voltage transformer 22 is fixed to the flange attachment associated with the current terminal 12. This voltage transformer module 22 supports, in an arrangement in the form of a column, an intermediate module (with no designation) and an L-shaped module accommodating the connection node 14. A horizontally guided encapsulating module of the disconnector 33 is fixed to a horizontally aligned flange attachment of the node module 14. The grounding switch 42, which serves the purpose of grounding the connection node 14, is arranged at the switch-side end of the disconnector module 33, and the grounding device 43, which serves the purpose of grounding the outgoing feeder 60, is arranged at the outgoing-feeder-side end of the disconnector module 33.

Figure 3:
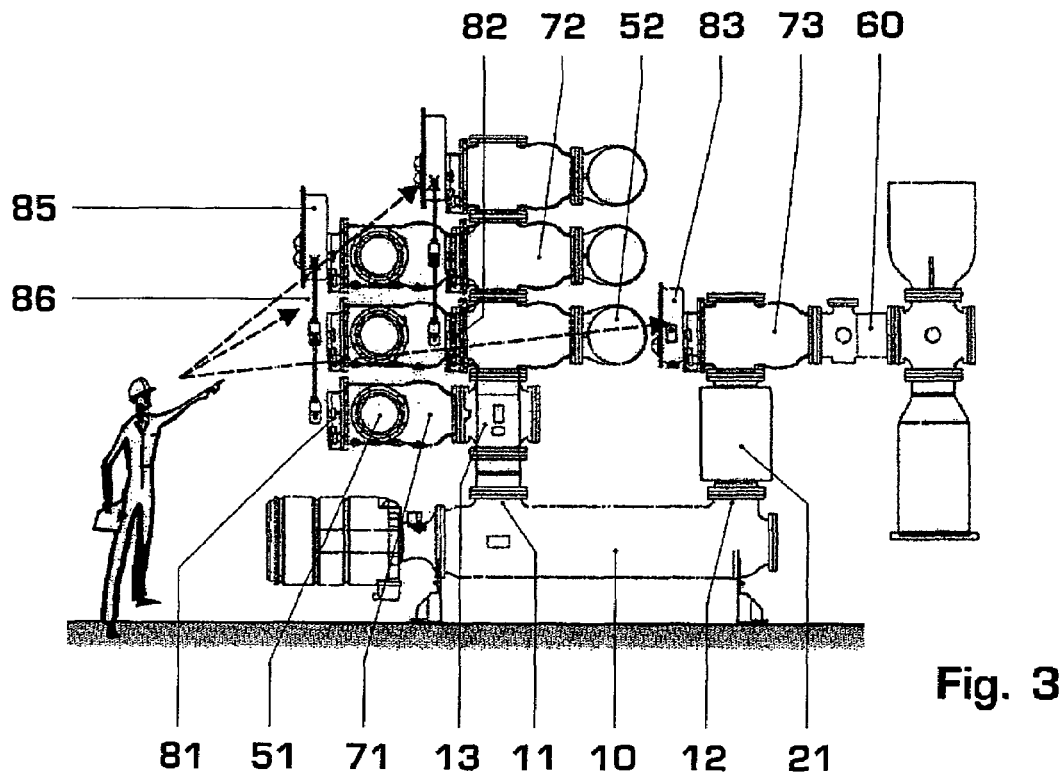
FIG. 3 shows a side view of a switchgear assembly according to the invention performing the same functions as the assembly of FIG. 1.

In the switchgear assembly according to the invention illustrated in FIG. 3, the same circuitry is realized as in the switchgear assembly shown in FIG. 1, but it has a different topology. This is firstly determined by the fact that, in place of the three disconnectors 31, 32 and 33 and two grounding devices 41 and 42 with in total five drives, only three switching devices having a disconnection and grounding function (combined disconnecting-earthing switches 71, 72, 73) are used which in each case only require a single drive 81, 82, 83 for carrying out the two functions. Secondly, this different topology is also brought about by the fact that the combined disconnecting-earthing switches 71, 72, 73 are aligned such that the three drives 81, 82, 83, which are provided for their actuation, point in the same, in this case predominantly horizontal direction. Furthermore, the disconnector modules 71, 72 and the busbars 51 and 52 supported by them are also arranged such that they are offset with respect to one another in the vertical direction.

Owing to the use of the combined disconnecting-earthing switches, the number of drives is reduced from five to three. In place of various types of switches, such as disconnectors and grounding devices, the combined disconnecting-earthing switch is now only used as a single switching device for performing disconnection and grounding tasks. Correspondingly, only a single drive type is now required, this type having a central drive head 85 and a connecting lever system 86 for the drive between the phases. These parts clearly correspond to the corresponding parts of the drive 82. In order to allow for a compact arrangement, the busbars 51 or 52 of different phases are arranged vertically one above the other, as can be seen. The combined disconnecting-earthing switches, for example 71 or 72, which are provided in the three phases but perform identical functions, are arranged on a diagonal determined by the vertical and horizontal direction or spacing and are connected to one another by means of the lever system 86 guided along this diagonal. As can be seen, in all three phases the combined disconnecting-earthing switches 71, 72, 73 are advantageously of identical design and/or are aligned in identical fashion. This also applies to further switching devices which may be provided and which are only in the form of disconnectors or only in the form of grounding devices.

The uniform alignment of the combined disconnecting-earthing switches 71, 72, 73 in the predominantly horizontal direction makes it possible for all of the drives 81, 82, 83 and therefore also their position indicators to be oriented towards a control aisle of the assembly. From the control aisle, the assembly can therefore be monitored and maintained much more easily. This can also be seen in FIG. 3. Since the drives of the combined disconnecting-earthing switches 71 and 72 are aligned towards one side and do not protrude on both sides of the busbars 51 and 52 as do the drives of the disconnectors 31 and 32, space is also saved. The advantages according to the invention are even achieved when at least two individual drives of combined disconnecting-earthing switches installed at different locations point in the same, typically horizontal direction.

It can also be seen from FIG. 3 that the visibility of the drives and the position indicators associated with them is also further improved if the combined disconnecting-earthing switches 71, 72, 73 and the busbars 51 and 52 supported by the combined disconnecting-earthing switches 71 and 72 are arranged such that they are offset with respect to one another in the vertical direction.

Figure 4:
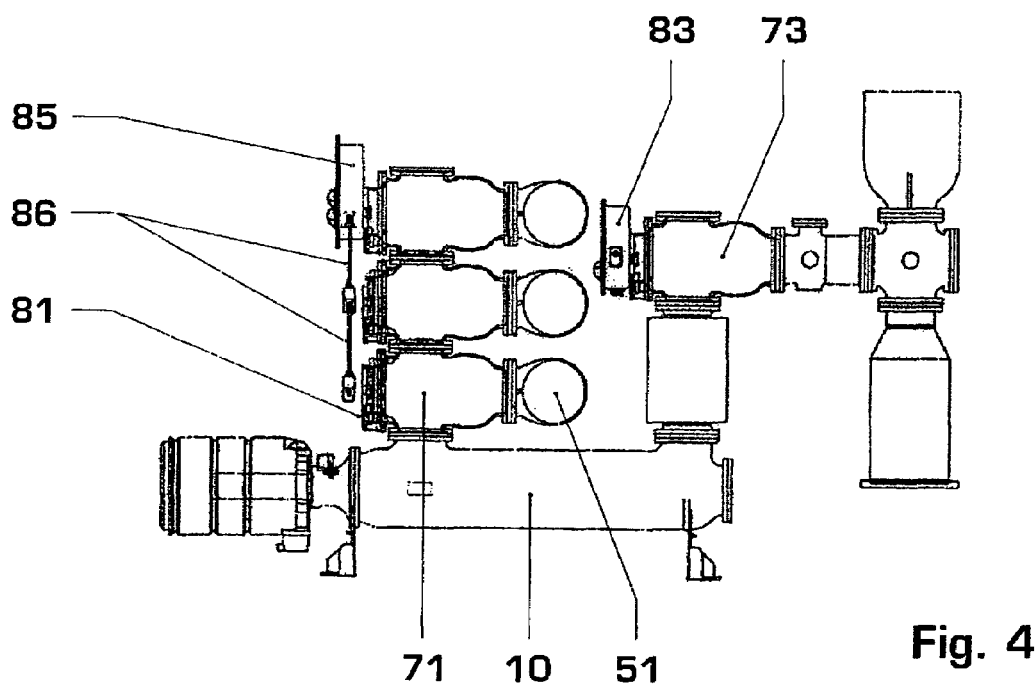
FIG. 4 shows a side view of an embodiment of the switchgear assembly according to the invention having a single busbar.

In contrast to the previously explained embodiments with the double busbar, the switchgear assembly illustrated in FIG. 4 has only the horizontally guided busbar 51, which is supported by the housing of the combined disconnecting-earthing switch 71. As a result of the fact that the drives of the combined disconnecting-earthing switches, namely the drive 81 of the combined disconnecting-earthing switch 71 provided on the busbar side and the drive 83 of the combined disconnecting-earthing switch 73 provided on the outgoing-feeder side, are guided in the horizontal direction and point in the same direction, the operational convenience and accessibility are considerably improved even in the case of this switchgear assembly with a single busbar.

Figure 5:
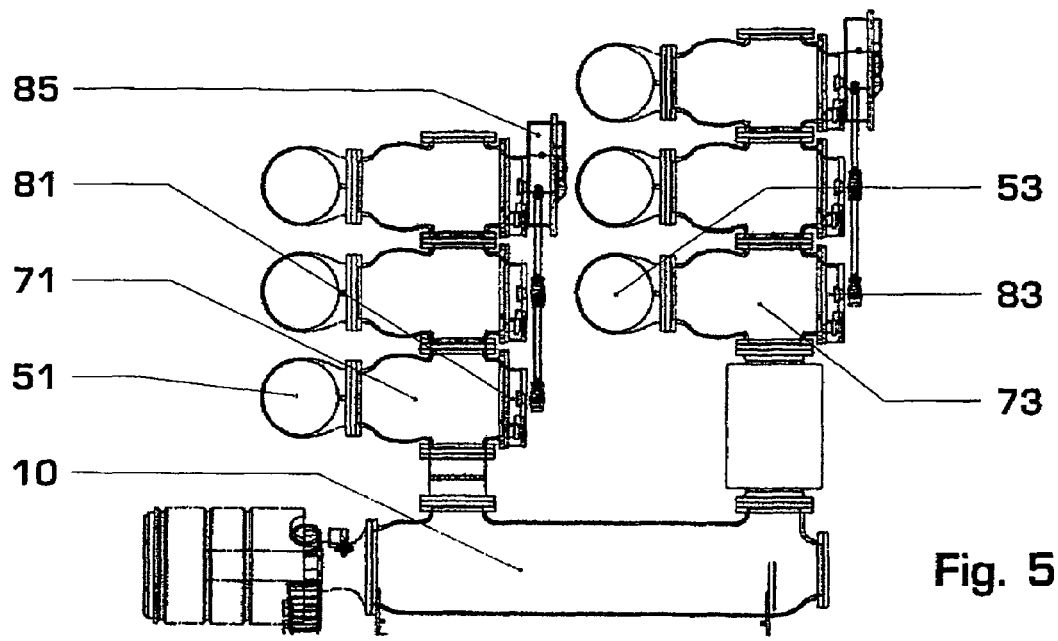
FIG. 5 shows a side view of a section of an embodiment of the switchgear assembly according to the invention in the form of a cross-coupling panel or feeder.

Even in the case of the cross-coupling feeder illustrated in FIG. 5 of one embodiment of the switchgear assembly according to the invention, the operational convenience and accessibility are excellent. As a result of the fact that the two busbars 51 and 53 and, in a corresponding manner, also the two combined disconnecting-earthing switches 71 and 73 are arranged such that they are offset vertically with respect to one another, the drives 81 and 83 can be seen particularly easily and are particularly easily accessible. Owing to the alignment of the drives 81 and 83 in one direction, at the same time space is saved. At the same time, in this case the number of switching devices required having a disconnector and/or grounding device function is halved.

Figure 6:
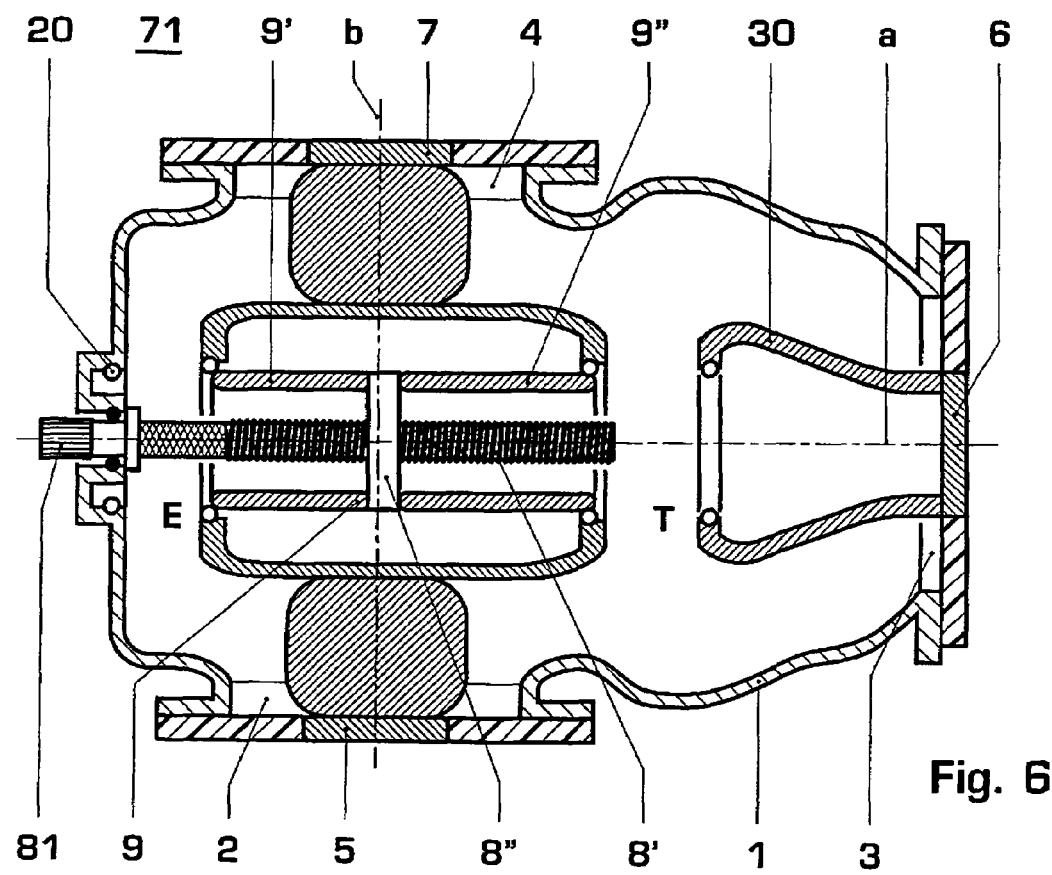
FIG. 6 shows a cross-sectional illustration through a combined disconnecting-earthing switch 71 used in the switchgear assembly of FIG. 3, and FIGS. 7, 8 show GIS configurations with a double busbar, in a side view, for a three-phase-encapsulated switchgear assembly according to the invention.
Figure 7:
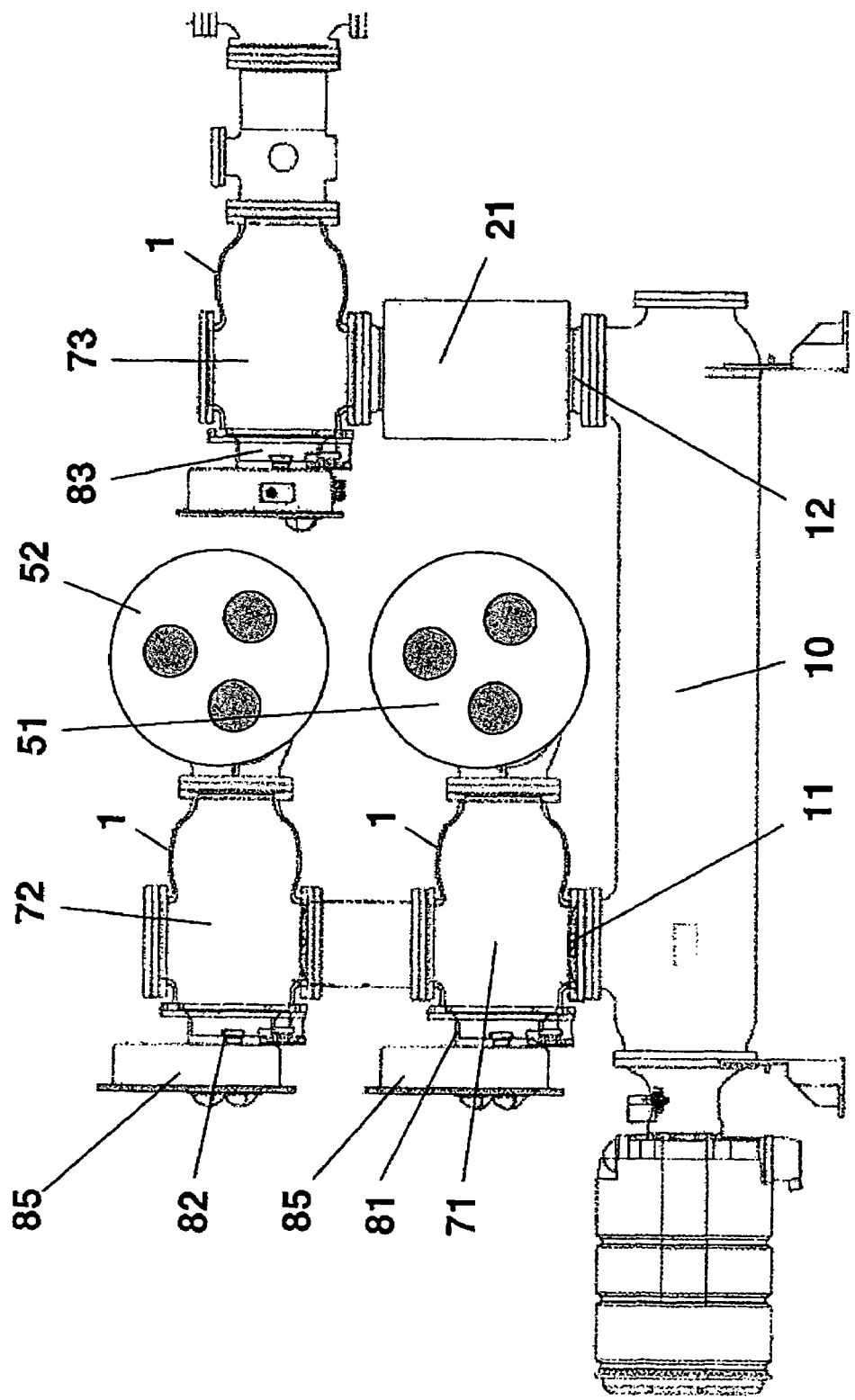
Figure 8:
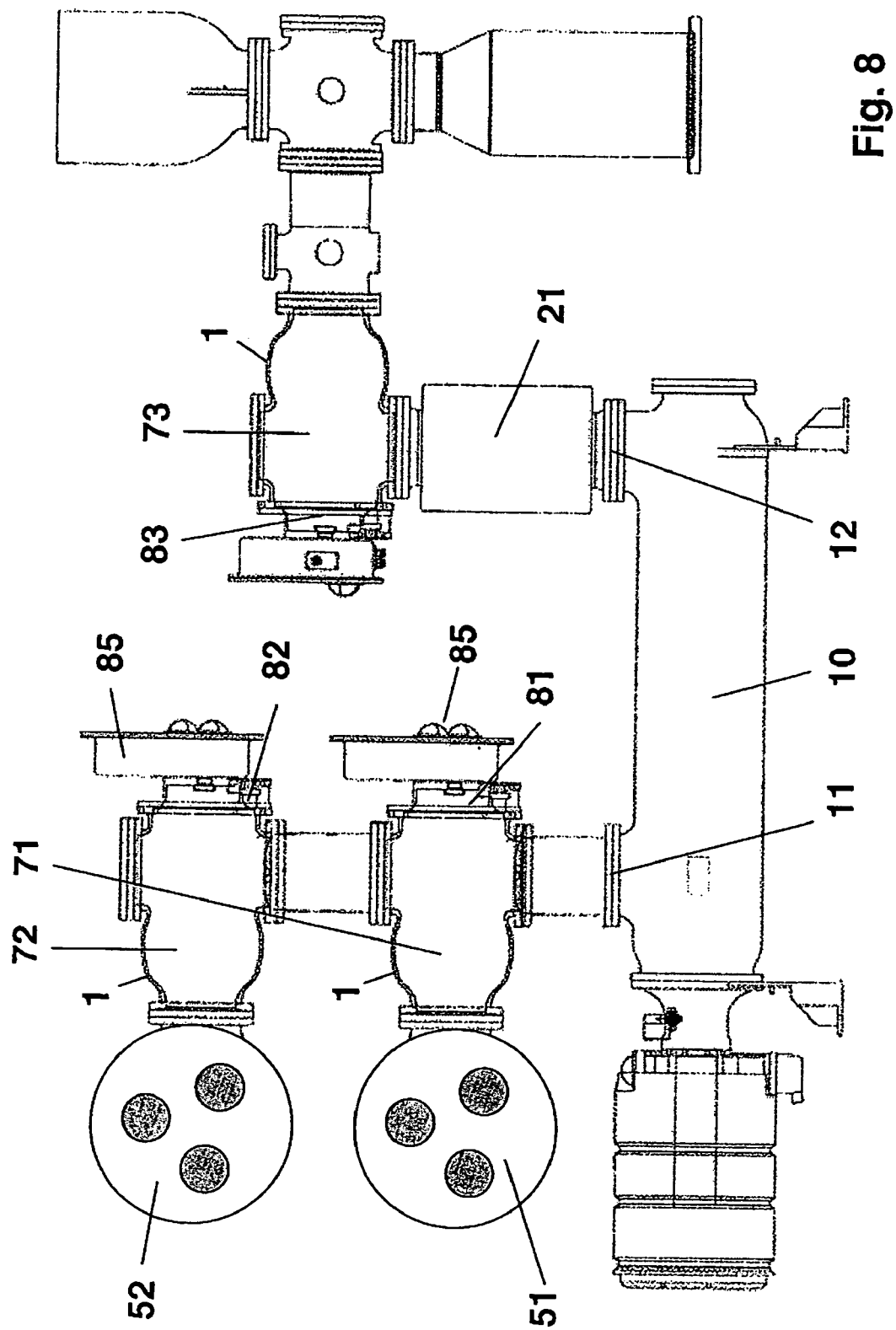

FIG. 6 illustrates the combined disconnecting-earthing switch 71, as it is when installed in the switchgear assembly shown in FIGS. 3-5 or else FIGS. 7-8. Reference will be made to the European priority application which is hereby incorporated, with its entire disclosure content, in the description. The combined disconnecting-earthing switch 71 or else 72 and 73 has a metal housing 1 which is filled with insulating gas and has three openings 2, 3 and 4, which are each delimited by a flange (with no designation). The flanges in each case serve the purpose of making the connection with a mating flange (not illustrated) of the adjacent module of the switchgear assembly. The openings 2 to 4 are in each case sealed in a gas-tight manner by a barrier insulator (with no designation), which, in a manner which is electrically insulated from the housing 1, supports in each case one current conductor 5, 6 and 7 which can have a high voltage applied to it.

A predominantly horizontal axis a, which determines the movement direction of a contact element 9 of the switching device which can be displaced by a threaded spindle 8' and a spindle nut 8" and along which the current conductor 6 is guided from the outside into the interior of the housing 1, passes centrally through the opening 3. The openings 2 and 4 are opposite one another in the housing 1 such that the current conductors 5 and 7 are aligned along a line b which is passed centrally through the openings. The axis a and the line b enclose a right angle with one another and therefore determine the geometry of a current path containing the current conductors 5 and 6. In addition to the conductor 6 and the moveable contact element 9, a grounding contact 20 and a disconnector contact 30, which is connected to the current conductor 6, are also arranged on the axis.

The current conductor 5 is connected to a section of the busbar 51 which is guided to the right, the current conductor 7 is connected to a section of the busbar 51 which is guided to the left, and the current conductor 6 is connected to the connection node 13. As can be seen, the combined disconnecting-earthing switch 71 is in the form of an elbow disconnector, and the two limbs of the elbow are arranged predominantly horizontally in the assembly. The moveable contact 9 has two contact parts 9', 9", which are connected, in particular detachably connected or fixedly connected, to one of the retaining elements (with no designation) or is even integral with said retaining element, and of which a first contact part 9' forms the mating contact of a grounding device E containing the grounding contact 20 and a second contact part 9" forms the mating contact of a stationary contact of a disconnector T. By removing one of the parts 9' or 9", it is thus possible for a switching device only having a grounding device function E or only having a disconnector function T to be formed from the combined disconnecting-earthing switch, which switching device may be installed in the assembly corresponding to the combined disconnecting-earthing switches 71 to 73.

The switch 71 is installed horizontally. The limbs of the elbow, namely the axis a and the busbar 51, which is guided as a longitudinal connection through the switch, extend horizontally. On the other hand, the switches 72 and 73 are installed vertically since only the axis a is guided horizontally, but the line b is guided vertically downwards.

The node module containing the connection node 13 is in the form of a T and is installed in the assembly such that the arms of the T are guided vertically and form a predominantly vertical longitudinal connection. The base of the T forms a predominantly horizontal transverse connection. If the module of the combined disconnecting-earthing switch 72 is now connected to the node module 13 at the upwardly guided arm of the T, and the module of the combined disconnecting-earthing switch 71 is connected to the node module 13 at the horizontally guided base of the T, the horizontal alignment of the drive axes a of the combined disconnecting-earthing switches 71 and 72 and, at the same time, the vertical displacement of the disconnectors is achieved directly, as a result. The housing of the node module 13 may be in the form of a T or in the form of an X, but, irrespective of this, the connection node formed by current conductors is in the form of a T. If the housing of the node module is in the form of an X, one of the four openings of the X can be closed by a cover or a rupture disk, but may advantageously also be used for passing through a sensor.

FIG. 7 and FIG. 8 show two exemplary embodiments similar to that in FIG. 3 with a double busbar in the case of a three-phase-encapsulated switchgear assembly. In FIG. 7, the drive apparatuses 81, 82 both of the first and the third combined disconnecting-earthing switches 71, 72 and the second combined disconnecting-earthing switch 73, which is arranged at the outgoing feeder, are oriented in the same direction. In other words, the busbar disconnectors 71, 72 and the outgoing-feeder disconnector 73 are oriented or aligned in identical fashion. In particular, the busbar disconnectors 71, 72 and the outgoing-feeder disconnector 73 have identical housings 1, in particular as described in FIG. 6, and are installed in the same orientation. In FIG. 8, the busbar disconnectors 71, 72 or their drive apparatuses 81, 82 are aligned in identical fashion, but in the opposite direction to the outgoing-feeder disconnector 73. The operational convenience, in particular the possibility to read and monitor at the same time, is in this case achieved for the busbar disconnectors 71, 72 alone. In any case, a very compact design is achieved for a gas-insulated switchgear assembly.

LIST OF REFERENCES

1 Encapsulating housing
2,3,4 Openings
5,6,7 Current conductors
8' Threaded spindle
8" Spindle nut
9 Contact element
9',9" Contact parts
10 Circuit breaker
11,12 Current terminals
13,14 Connection node, node module
20 Grounding contact
21 Current transformer
22 Voltage transformer
30 Disconnector contact
31,32,33 Disconnectors
41,42,43 Grounding devices
51,52,53 Busbars
60 Outgoing feeder
71,72,73 Combined disconnecting-earthing switches
81,82,83 Drives
85 Drive head, central drive head
a Axis
b Line
E Grounding device
T Disconnector

The invention claimed is:

1. An encapsulated gas-insulated switchgear assembly having a modular design, containing at least one first busbar, which is guided predominantly horizontally, a circuit breaker having two current terminals, of which a first current terminal can be connected to the first busbar and at least two combined disconnecting-earthing switches having a disconnection and grounding function, of which a first combined disconnecting-earthing switch is connected between the first busbar the first current terminal and the second combined disconnecting-earthing switch is connected between an outgoing feeder or a second busbar, which is guided predominantly horizontally, of the switchgear assembly and the second current terminal of the circuit breaker, a housing of the first combined disconnecting-earthing switch supporting a section of the first busbar, wherein the housings of the combined disconnecting-earthing switches are aligned such that at least two drive apparatuses, which are provided for their actuation, point in the same direction.

2. The switchgear assembly as claimed in claim 1, wherein the switchgear assembly is single-phase-encapsulated or three-phase-encapsulated.

3. The switchgear assembly as claimed in claim 1, wherein a common drive apparatus is provided in each case for three phases or a dedicated drive apparatus is provided in each case for each phase.

4. The switchgear assembly as claimed in claim 1, wherein all of the drive apparatuses point in the same direction.

5. The switchgear assembly as claimed in claim 1, wherein the drive apparatuses point in the same, predominantly horizontal direction.

6. The switchgear assembly as claimed in claim 1, wherein the circuit breaker is aligned horizontally.

7. The switchgear assembly as claimed in claim 1, wherein the combined disconnecting-earthing switches are of identical design.

8. The switchgear assembly as claimed in claim 1, wherein the housing of the second combined disconnecting-earthing switch supports a section of the second busbar, and wherein the housings and the busbars supported by them are arranged such that they are offset with respect to one another in the vertical direction.

9. The switchgear assembly as claimed in claim 1, wherein at least one third busbar is provided which is guided predominantly horizontally and can be connected to the first current terminal via a third combined disconnecting-earthing switch, and wherein a housing of the first combined disconnecting-earthing switch supports a section of the first busbar, and a housing of the third combined disconnecting-earthing switch supports a section of the third busbar.

10. The switchgear assembly as claimed in claim 9, wherein the third combined disconnecting-earthing switch has an identical design to the first combined disconnecting-earthing switch.

11. The switchgear assembly as claimed in claim 1, wherein the two housings are connected to one another via a module, which contains a connection node of the first current terminal, and wherein the housings of the first combined disconnecting-earthing switch and the third combined disconnecting-earthing switch and the busbars supported by these housings are arranged such that they are offset with respect to one another in the vertical direction.

12. The switchgear assembly as claimed in claim 11, wherein the module containing the connection node is in the form of a T and is installed in the assembly such that the arms of the T are aligned vertically and form a predominantly vertical longitudinal connection, such that the base of the T forms a predominantly horizontal transverse connection, and such that the module of the first combined disconnecting-earthing switch is connected to the node module at the horizontally guided base of the T, and the module of the third combined disconnecting-earthing switch is connected to the node module at the upwardly guided arm of the T.

13. The switchgear assembly as claimed in claim 1, wherein the combined disconnecting-earthing switches are each in the form of elbow disconnectors, at least the first (a) of the two limbs (a, b) of the elbow being arranged predominantly horizontally and containing, in a coaxial arrangement, a grounding contact, a drive guided through the grounding contact and two contacts of a disconnector.

14. The switchgear assembly as claimed in claim 1, wherein one of the two disconnector contacts is configured to be moveable and contains two contact parts, which are connected to a retaining element and of which a first contact part forms the mating contact of a grounding device (E) containing the grounding contact and a second contact part forms the mating contact of a stationary contact of the disconnector (T).

15. The switchgear assembly as claimed in claim 13, wherein the second limb (b) of the elbow is guided vertically or horizontally.

16. The switchgear assembly as claimed in claim 1 having two or more encapsulated phases, wherein the combined disconnecting-earthing switches and further switching devices which may be provided and which are only in the form of disconnectors or only in the form of grounding devices are of identical design in all phases.

17. The switchgear assembly as claimed in claim 1 having two or more encapsulated phases, wherein the combined disconnecting-earthing switches and further switching devices which may be provided and which are only in the form of disconnectors or only in the form of grounding devices are aligned in identical fashion in all phases.

18. The switchgear assembly as claimed in claim 1, wherein switching devices which are arranged in different phases but perform identical functions are arranged on a diagonal determined by the vertical and horizontal spacing.

19. The switchgear assembly as claimed in claim 2, wherein a common drive apparatus is provided in each case for three phases or a dedicated drive apparatus is provided in each case for each phase.

20. The switchgear assembly as claimed in claim 19, wherein all of the drive apparatuses point in the same direction.

21. The switchgear assembly as claimed in claim 20, wherein the drive apparatuses point in the same, predominantly horizontal direction.

22. The switchgear assembly as claimed in claim 21, wherein the circuit breaker is aligned horizontally.

23. The switchgear assembly as claimed in claim 22, wherein the combined disconnecting-earthing switches are of identical design.

24. The switchgear assembly as claimed in claim 23, wherein the housing of the second combined disconnecting-earthing switch supports a section of the second busbar, and wherein the housings and the busbars supported by them are arranged such that they are offset with respect to one another in the vertical direction.

25. The switchgear assembly as claimed in claim 24, wherein at least one third busbar is provided which is guided predominantly horizontally and can be connected to the first current terminal via a third combined disconnecting-earthing switch, and wherein a housing of the first combined disconnecting-earthing switch supports a section of the first busbar, and a housing of the third combined disconnecting-earthing switch supports a section of the third busbar.

26. An encapsulated gas-insulated switchgear assembly having a modular design, comprising:

at least one first busbar;

a circuit breaker having first and second current terminals, of which the first current terminal can be connected to the first busbar;

at least two combined disconnecting\circuit common switches having a disconnection function, of which a first combined disconnecting\circuit common switch is connected between the first busbar the first current terminal and the second combined disconnecting\circuit common switch is connected between an additional conductor of the switchgear assembly and the second current terminal of the circuit breaker;

a housing of the first combined disconnecting\circuit common switch supporting a section of the first busbar, wherein housings of the at least two combined disconnecting\circuit common switches are aligned such that at least two drive apparatuses, which are provided for their actuation, point in a common direction.

* * * * *